United States Patent [19]
Shellhammer

[11] Patent Number: 6,099,227
[45] Date of Patent: Aug. 8, 2000

[54] TELESCOPING FLAT BED GRIPPING AND LIFT ASSEMBLY

[75] Inventor: Gary L. Shellhammer, Anthony, Kans.

[73] Assignee: Harper Industries, Inc., Harper, Kans.

[21] Appl. No.: 09/207,874

[22] Filed: Dec. 8, 1998

[51] Int. Cl.[7] .................................................. B66F 9/18
[52] U.S. Cl. .................................... 414/24.5; 414/718
[58] Field of Search .................................. 414/24.5, 498, 414/728, 718, 741, 486, 487, 547, 555, 667

[56] References Cited

U.S. PATENT DOCUMENTS

| | | |
|---|---|---|
| 2,975,918 | 3/1961 | Sharp . |
| 3,184,088 | 5/1965 | Berge ........................................ 414/667 |
| 3,352,441 | 11/1967 | Alden ........................................ 414/718 |
| 3,445,015 | 5/1969 | Sampo ....................................... 414/718 |
| 3,625,445 | 12/1971 | Hall . |
| 3,655,232 | 4/1972 | Martelee . |
| 3,820,673 | 6/1974 | McVaugh . |
| 3,877,595 | 4/1975 | Edelman . |
| 3,880,305 | 4/1975 | Van Polen . |
| 3,946,887 | 3/1976 | Parker . |
| 3,958,772 | 5/1976 | Hynson ..................................... 414/741 |
| 4,044,963 | 8/1977 | Hostetler . |
| 4,090,624 | 5/1978 | Krein et al. . |
| 4,091,946 | 5/1978 | Kraeft . |
| 4,094,428 | 6/1978 | White et al. . |
| 4,325,666 | 4/1982 | Chain et al. . |
| 4,478,547 | 10/1984 | Den Boer . |
| 4,564,325 | 1/1986 | Ackerman . |
| 4,579,497 | 4/1986 | Nine . |
| 4,594,041 | 6/1986 | Hostetler . |
| 4,652,201 | 3/1987 | Boughton ................................. 414/498 |
| 4,687,402 | 8/1987 | Zatylny .................................... 414/24.5 |
| 4,696,503 | 9/1987 | Collodel . |
| 4,722,651 | 2/1988 | Antal . |
| 4,773,806 | 9/1988 | Beaulieu .................................. 414/24.5 |
| 5,082,413 | 1/1992 | Grosz . |
| 5,509,770 | 4/1996 | Burenga . |
| 5,584,637 | 12/1996 | Jensen, Sr. . |

*Primary Examiner*—Gregory A. Morse
*Attorney, Agent, or Firm*—Shughart Thomson & Kilroy P.C.

[57] ABSTRACT

A telescoping gripping and lift assembly for use with a flat bed truck or the like includes a pair of gripper arms, each of which is attached to a transverse lift housing which, in turn, is pivotably attached to the rear of the flat bed. Each of the gripper arms is telescopically extendable relative to a respective opposing end of the lift housing between grip and release positions via a pressure equalizing gripping piston & cylinder unit positioned within the lift housing. In addition, each of the gripper arms is a two part construction with an outer sleeve encompassing an inner sleeve and with a respective hydraulic telescoping cylinder selectively extending and retracting the larger outer sleeve relative to the smaller inner sleeve.

12 Claims, 4 Drawing Sheets

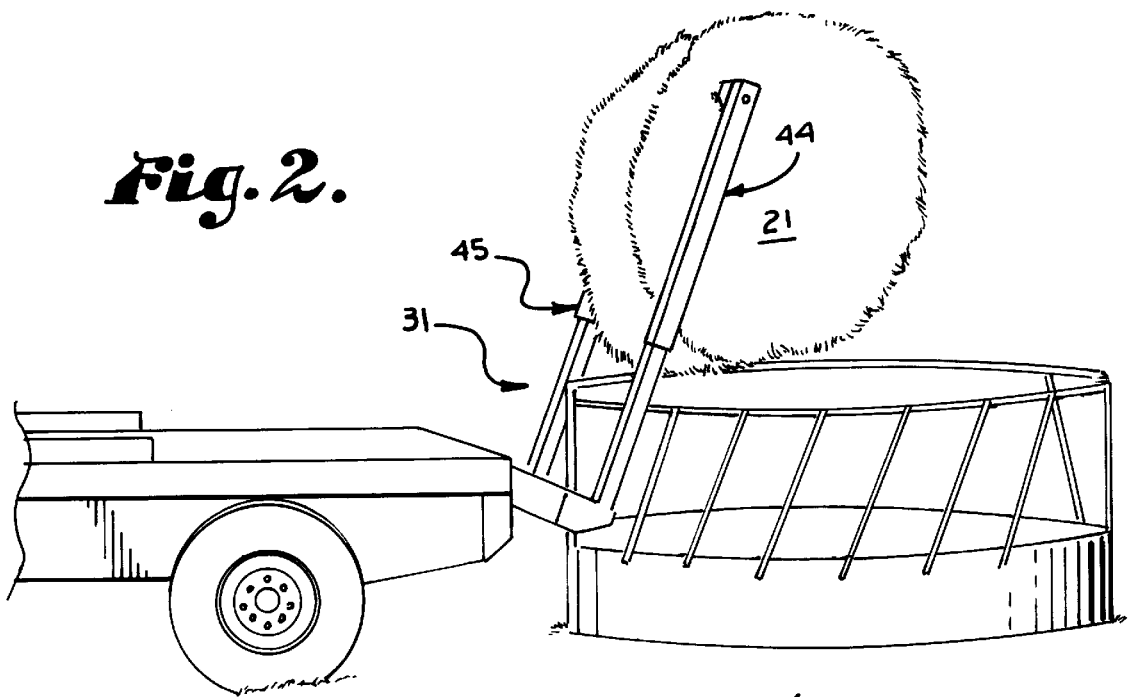
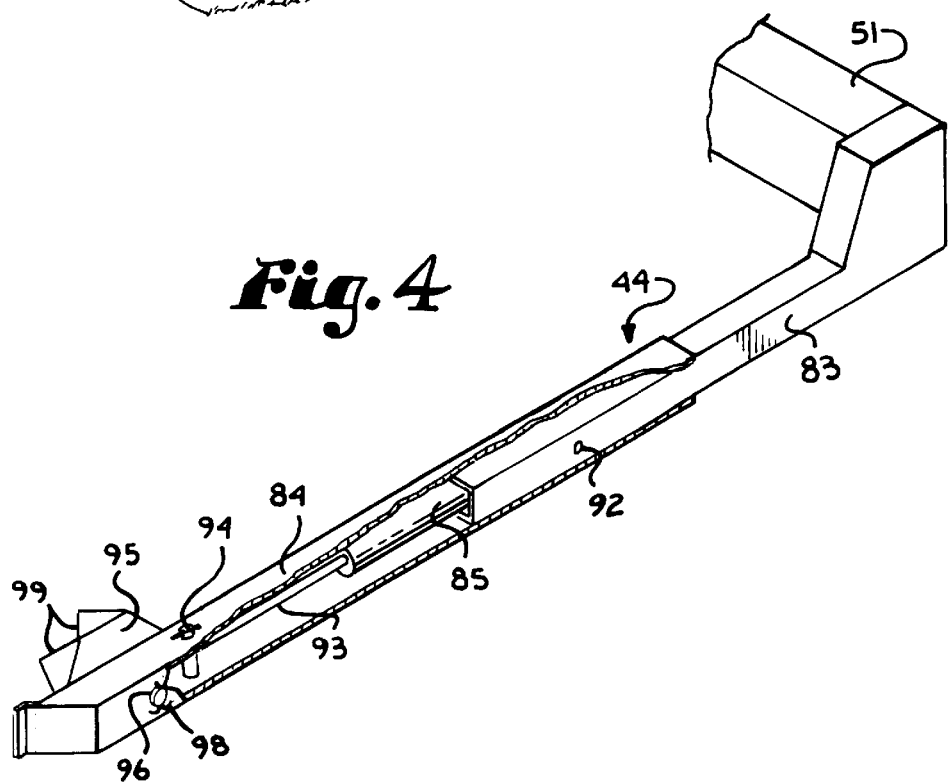

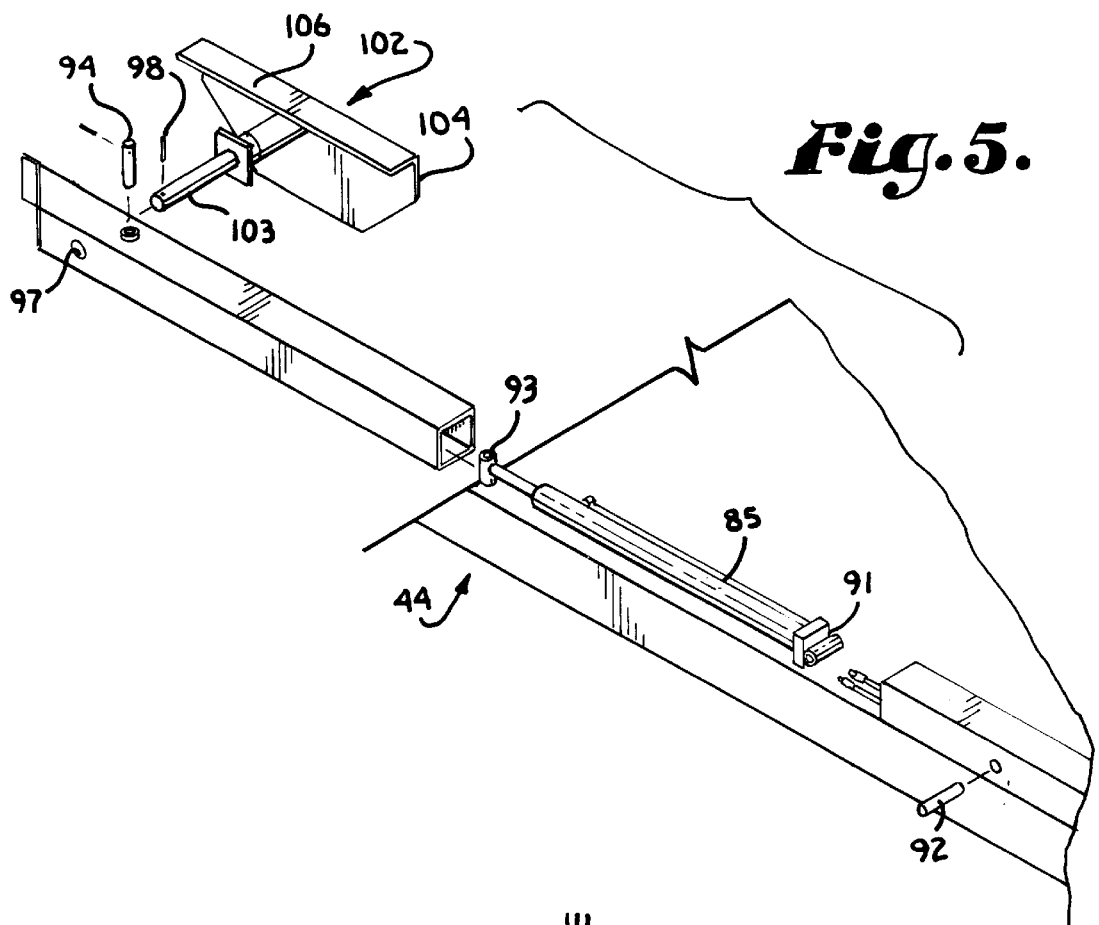
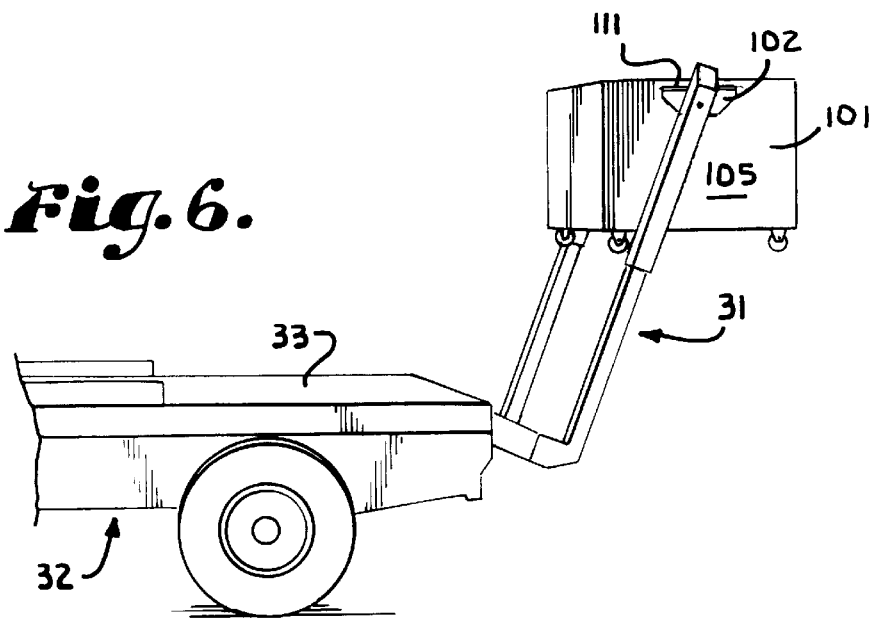

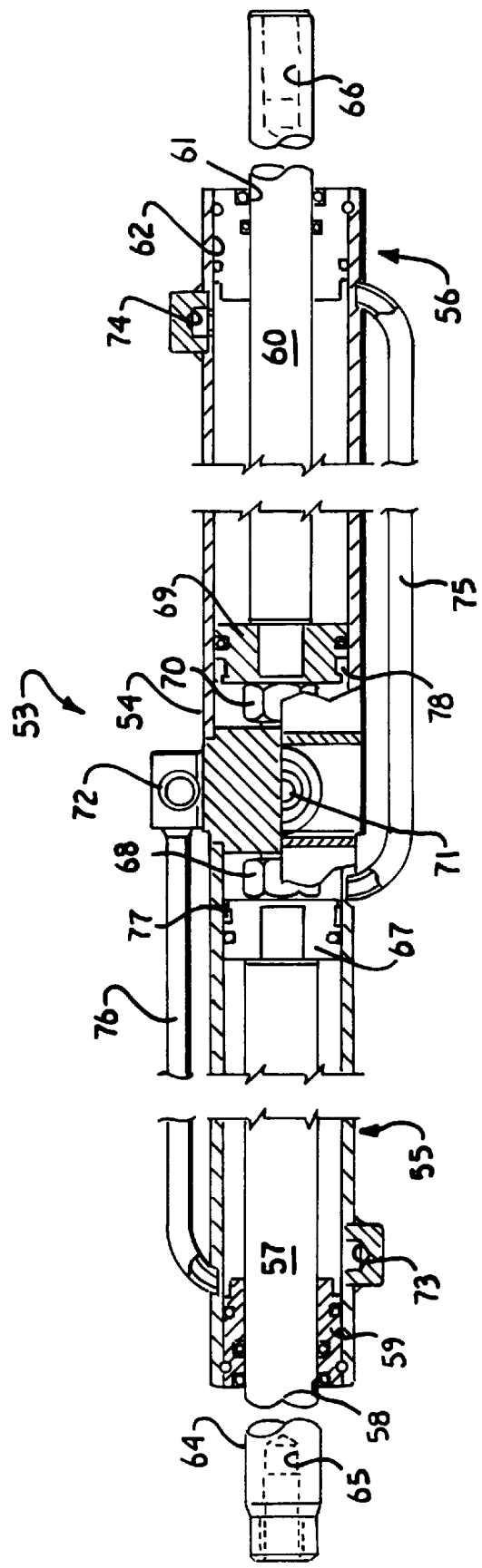

TELESCOPING FLAT BED GRIPPING AND LIFT ASSEMBLY

BACKGROUND OF THE INVENTION

1. Field of the Invention

This invention is directed to a telescoping gripping and lift assembly designed for lifting and securing large hay bales and other large objects, such as rectangular trash containers, onto an elevated flat surface, such as the bed of a flat bed truck. More particularly, the gripping and lift assembly includes an opposed pair of gripper arms which are each selectively movable between raised and lowered positions, grip and release positions, and telescopically extended and retracted positions.

2. Description of the Related Art

In the past, hay for feeding livestock was cut and baled into relatively small, rectangularly shaped hay bales weighing about 100 pounds. These bales could be readily lifted and handled by a man acting alone and required storage out of the weather in barns or other storage buildings. When the hay was needed for feeding cattle, a desired number of these small hay bales were simply removed from storage, brought to the livestock and broken open for feeding.

For economic reasons, including reducing labor costs and storage requirements, this method of storing hay in small bales has been largely replaced by the use of large hay bales weighing upwards of 2000 lbs. each. These large bales, which can be round or square, can simply be left in the field or stacked outdoors and removed only as they are needed for feeding. Thus, large bales do achieve the goals of reduced labor and storage costs.

However, such large bales do present handling problems. Their large bulk and weight make it physically impossible to move them manually. Therefore, farmers and cattle ranchers have needed specialized mechanical equipment for moving these large bales.

In addition, a need exists for loading and transporting free standing rectangular trash containers such as are commonly used by institutions such as schools, churches, etc.

A number of previous attempts have been made to create machinery which can be attached to a pick-up or flat bed truck to allow the lifting and transport of large hay bales.

U.S. Pat. No. 4,325,666 to Chain et al. is directed to a bale handling apparatus for a pick-up truck which is capable of loading and transporting two bales at once. This bale handler is necessarily large and complex and, once installed, essentially limits the pick-up to bale hauling tasks.

U.S. Pat. No. 4,564,325 (the '325 patent) to Ackerman is directed to a round bale loader for a flat bed truck which is designed to allow the truck to be also used for other, general purpose hauling and towing tasks. A pairs of bale gripper arms are connected to a frame which is pivotally attached to the rear of the truck. A hydraulic actuator is attached beneath the truck bed and is actuated to pivot the arms up and onto the bed. The arms can be drawn toward each other by a pair of hydraulic cylinders. When not in use, the arms are received and stored in grooves in the truck bed.

U.S. Pat. No. 4,594,041 (the '041 patent) to Hostetler is drawn to another round bale handling apparatus which employs a pair of gripper arms which can be urged together to grip a round bale and then pivoted up over the truck bed to transport the bale. A hydraulic actuator mounted beneath the vehicle bed is used to selectively pivot the arms along with a gripped hay bale up and onto the truck bed.

Both the '325 and the '041 patent are intended for use with a flat bed truck and are both designed to allow the truck to be used for other purposes when not loading or transporting hay bales. However, in both the '325 and the '041 patents, a bale gripping mechanism is operated via a transverse "squeeze" arrangement wherein a pair of hydraulic piston & cylinder units are selectively operated, pulling, in the '041 patent and pushing, in the '325 patent, a respective pair of fixed length arms transversely inward to engage a large bale. In the '041 patent, the arms are attached to respective telescoping square tubes which retract within a stationary square tube attached to the rear of the truck bed. In the '325 patent, a pair of elongate arms are pivotable toward each other to grip a bale positioned there between. A problem with both of these prior art arrangements is the limited reach of the gripper arms. In both the '325 and '041 patent, the lift operation is essentially limited to lifting a large bale off of the is ground and depositing it onto the flat bed, and vice versa. Thus, they do not allow a large bale to be lifted off of the flat bed and then raised to a position where it can be put into an bale feeder or the like.

In addition, hydraulic systems for the gripper arms on prior art systems such as the '041 patent typically use a "least resistant" hydraulic system in which hydraulic fluid under pressure is simultaneously supplied to independent gripping piston & cylinder units operating each respective gripper arms with the fluid entering the "least resistant" gripping piston & cylinder unit. This often causes an intermittent operation of the gripper arms as their gripping piston & cylinder units alternate being the least resistant. Also, since the view of an operator in the truck bed is often obscured by the bale being lifted, intermittent operation of the gripper arms prevents the operator from assuming that the position of a visible one of the arms is mirror image of the other.

It is clear then, that a need exists for a telescoping gripping and lift assembly capable of lifting large hay bales onto an elevated flat surface, such as a truck flat bed and for lifting the bales off of the flat bed and telescopically extending to allow deposit of the bale onto a feeder or other remote receptacle. The telescoping mechanism must remain rigid enough to support the bale in an extended position. Such a gripping and lift assembly should also be versatile enough to be used to lift and transport other large objects, such as rectangular trash receptacles. Finally, the gripping and lift assembly should preferably use a synchronized hydraulic gripping system which allows a bale or other large object to be uniformly gripped and secured with a smooth and continuous operation of the gripper arms and which allows an operator to view one gripper arm and determine that the opposite arm is in an equivalent position.

SUMMARY OF THE INVENTION

In the practice of the present invention, a telescoping gripping and lift assembly for use with a flat bed truck or the like includes a pair of gripper arms, each of which is attached to a transverse lift housing. The lift housing is pivotably attached to the rear of the truck bed and a lifting hydraulic piston & cylinder unit extends from the lift housing and through the rear of the flat bed to an attachment point beneath the flat bed. The lift housing is thus selectively pivotable 180 degrees between a raised position immediately adjacent the rear of the bed and a lowered position immediately below and behind the truck bed. The pair of gripper arms are each attached to a respective sleeve which surrounds and is selectively telescopically extendable relative to a respective opposing end of the lift housing. A gripping twin piston & cylinder unit is positioned within the lift housing with one piston attached to each one of the gripper arm sleeves. The gripper arms are thus selectively retractable toward each other to a grip position or extendable away from each other to a release position. In addition, each of the gripper arms is a two-part construction with an outer sleeve encompassing an inner sleeve. A respective hydraulic telescoping cylinder is enclosed within each inner sleeve and has one end attached to the outer sleeve and a second end attached to the inner sleeve. Each outer sleeve is thus selectively extendable relative to the inner sleeve such that the gripper arm can be telescoped outward to deposit a large hay bale or trash container, etc. in a remote location. The extension of the larger outer sleeve relative to the fixed, smaller inner sleeve enables each gripper arm to remain rigid during extension. The gripping twin piston & cylinder unit operates such that extension and retraction of the pair of gripper arms is even and uniform. Each gripper arm can include a respective bale gripping disc or interchangeable trash container supporting bracket positioned on the inside of the gripper arm near the terminal end of the outer sleeve. The opposing bale gripping discs or container is gripping brackets are swivel mounted to their respective arms via respective inward extending shafts such that they can freely rotate as the arms are moved between raised and lowered and telescopically extended and retracted positions.

OBJECTS AND ADVANTAGES OF THE INVENTION

The principal objects and advantages of the present invention include: to provide an improved gripping and lift assembly for a flat bed truck or the like; to provide such a gripping and lift assembly which reliably grips and secures large hay bales; to provide such a gripping and lift assembly which, when not in use, lies flat on the truck bed with a low profile to allow the truck to be used for general purpose hauling and towing tasks; to provide such a gripping and lift assembly with a pair of gripper arms, each of which can be selectively telescopically extended or retracted; to provide such a gripping and lift assembly in which each gripper arm includes an inner sleeve and a larger outer sleeve with the outer sleeve being selectively extendable relative to the inner sleeve during telescoping operations; to provide such a gripping and lift assembly in which a twin gripping piston & cylinder unit operates such that gripping and releasing operations are even and uniform; to provide such a gripping and lift assembly which has interchangeable bale gripper discs or container support brackets to allow either large hay bales or rectangular trash containers to be gripped, transported and off loaded; and to provide such a gripping and lift assembly which is reliable, economical to manufacture, and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a perspective view of the inventive flat bed gripping and lift assembly with telescoping gripper arms, also illustrated depositing a large bale into a circular feeder.

FIG. 4 is a greatly enlarged, fragmentary view of one of a pair of mirror image gripper arms equipped with a bale gripping disc.

FIG. 5 is a greatly enlarged, fragmentary exploded view of a portion of one of a pair of mirror image gripper arms equipped with a trash container support bracket, FIG. 6 is a reduced, fragmentary perspective view of a flat bed truck with the inventive flat bed gripping and lift assembly with telescoping gripper arms, illustrated gripping and lifting a rectangular trash container.

FIG. 7 is a detailed schematic diagram of the gripping hydraulic piston & cylinder unit with portions of the cylinder sidewall broken away to illustrate the interior construction thereof and the pressure equalizing mechanism.

DETAILED DESCRIPTION OF THE INVENTION

I. Introduction and Environment

Figure 1:
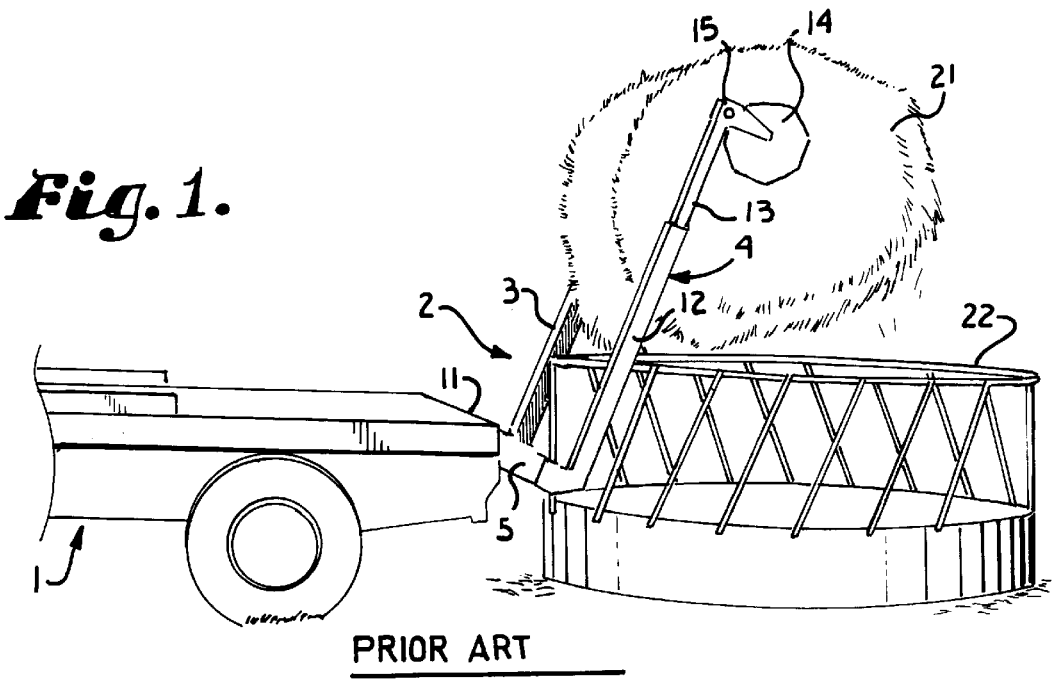
FIG. 1 is a perspective view of a prior art flat bed gripping and lift assembly with telescoping gripper arms illustrated depositing a large bale into a circular feeder.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "up," "down," "right" and "left" will refer to directions in the drawings to which reference is made. The words "inward" and "outward" will refer to directions toward and away from, respectively, the geometric center of the embodiment being described and designated parts thereof. Said terminology will include the words specifically mentioned, derivatives thereof and words of a similar import.

II. Prior Art

Referring to the drawings in more detail, FIG. 1 illustrates a flat bed truck 1 equipped with a prior art gripping and lift assembly, generally indicated at 2. The gripping and lift assembly 2 includes a pair of opposed gripper arms 3 and 4 attached to respective opposite ends of a lift housing 5. The lift housing 5 is selectively pivotable relative to a rear surface 11 of the flat bed truck 1. Each of the gripper arms 3 and 4 includes an outer sleeve 12 and an inner sleeve 13 with a bale gripper disc 141 attached to and extending inward from a terminal end 15 of the inner sleeve 13. In a well known manner, as taught, for example, in the Hostetler '041 patent, each gripper arm 3 and 4 is selectively movable toward and away from the opposing gripper arm via gripping hydraulic cylinders (not shown) to respective gripping and release positions. In addition, each inner sleeve 12 is selectively, telescopically extendable and retractable relative to the corresponding outer sleeve 13 via a respective enclosed hydraulic cylinder (not shown). This allows the prior art gripping and lift assembly to be able to raise a round bale, such as the illustrated bale 21, and to deposit it in a remote area, such as into a round bale feeder 22. A problem with the prior art gripping and lift assembly 2 is the tendency for the telescoped gripper arms 3 and 4 to rack and bend with the large bale 21 attached to the smaller, telescoped inner sleeve 13. Another problem associated with the prior art assembly 2 is the earlier mentioned intermittent and uneven operation of gripping movements caused by use of a "least resistant" hydraulic system in which hydraulic fluid under pressure is simultaneously supplied to both gripper arms with the fluid entering the "least resistant" piston & cylinder unit.

III. Inventive Gripping and Lift Assembly

FIGS. 2–6 illustrate the inventive gripping and lift assembly, generally indicated at 31. The assembly 31 is shown attached to a truck 32 equipped with a flat bed 33. The assembly 31 includes a lift housing 34 which is pivotably attached to the bottom rear of the bed 33 via a pair of hinges 35. A lift piston & cylinder unit 41 has a first end (not shown) pivotably secured to the truck 32 beneath the bed 33 and a respective second end pivotably attached to a lift bracket 43. The lift bracket 43 is attached, in turn, to the lift housing 34.

The lift assembly 31 also includes a pair of gripper arms 44 and 45 which are attached to respective sleeves 51 and 52, each of which surrounds a portion of the lift housing 34. Each of the sleeves 51 and 52 can be telescopically extended and retracted relative to the lift housing 34 via a gripping twin hydraulic piston & cylinder unit 53.

FIG. 7 illustrates the gripping twin hydraulic piston & cylinder unit 53 which is designed to supply equal gripping pressure to both gripper arms 44 and 45. The gripping twin piston & cylinder unit 53 includes a twin cylinder housing 54 with a left cylinder portion 55 having an inner diameter significantly smaller than the inner diameter of a right cylinder portion 56. Due to a greater length of the left cylinder portion 55, the overall volume of the left cylinder portion is equal to that in the right cylinder portion. A left gripping piston 57 extends through a central opening 58 in a seal 59 in the left cylinder portion 55 while a right gripping piston 60 extends through a central opening 61 in a right seal 62 in the right cylinder portion 63. The left piston 57 has an outer portion 64 which is attachable to the left gripper arm 44 via a bolt (not shown) extending into a threaded receiver 65. The right piston 60 is attached to the right gripper arm 45 via a bolt (not shown) extending into a threaded receiver 66. The left piston 57 is attached to a movable seal 67 via a nut 68 while the right piston 60 is attached to a movable seal 69 via a nut 70.

An extend port 71 receives hydraulic fluid under pressure when the pistons 57 and 60 are to be extended, i.e.,the gripper arms 44 and 45 are to be moved to the release position. Similarly a retract port 72 receives hydraulic fluid under pressure when the pistons 57 and 60 are to be retracted, i.e., the gripper arms 44 and 45 are to be moved to the gripping position. A rephase port 73 is positioned in the wall of the left cylinder portion 55 while a second rephase port 74 is positioned in the wall of the right cylinder portion 56.

The pressure equalizing feature of the gripping twin piston & cylinder unit 53 works in the following manner. AS hydraulic fluid enters the extend side of the right cylinder portion 56 from the extend port 71, right piston 60 moves outward. This movement of the piston seal 69 outward forces fluid from the right cylinder portion 56 through a welded connection tube 75 into the extend side of the left cylinder portion 55. This fluid entering the left cylinder portion 55 forces the left piston 57 outward at the same rate as the right piston 60. Similarly, during retract (i.e., gripping) operations, fluid enters the outer area of the left cylinder portion 55 via the retract port 72 and a welded tube 76. As the left piston 57 is forced inward, fluid is forced from the left cylinder portion 55 to the right cylinder portion 56 via the welded tube 75. Fluid entering the right cylinder portion 56 forces the right piston 60 back to the left at the same rated as the left piston 57 is being forced to the right. Each rephase port 73 and 74 acts to bypass fluid around the respective movable seals 67 and 69 as the pistons 57 and 60, respectively, reach the end of their travel. In order to allow such bypassing of fluid, the movable seals 67 and 69 each contain a respective gap 77, 78, which allows the rephase ports 73 and 74, respectively to cycle fluid past them as the respective pistons 57 and 60 each the terminal end of the travel. The even and consistent movement of both gripper arms 44 and 45 accomplished by the pressure equalizing twin piston & cylinder unit 53 allows an operator to view the position of one of the arms, e.g. the left arm 44, and assume that the position of the right arm 45 is in an equivalent position. This facilitates the selective gripping and securing of objects, such as hay bales 21, without risk of damage.

Figure 3:
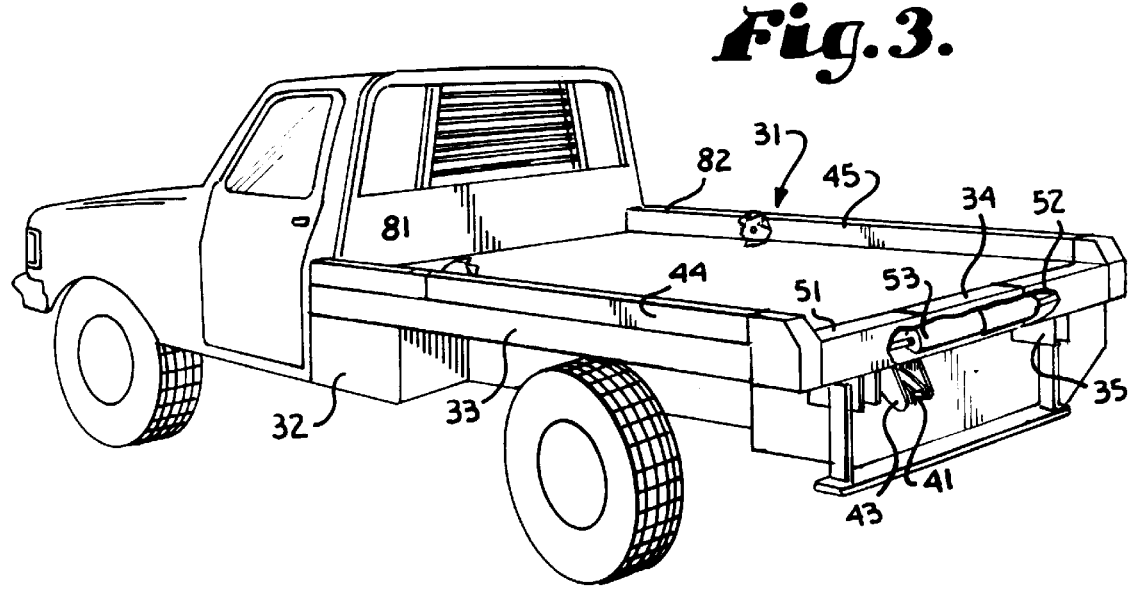
FIG. 3 is perspective view of a flat bed truck equipped with the inventive gripping and lift assembly, with the gripper arms retracted and resting on the flat bed, and with portions of a lift housing broken away to illustrate a pressure equalizing gripping piston & cylinder unit.

FIG. 3 shows the gripping and lift assembly 31 retracted onto the flat bed 33 with the gripper arms 44 and 45 lying flush along the sides of the flat bed 33 due to the extension of the lift piston & cylinder unit 41. The gripper arms 44 and 45, when retracted, lie in alignment with a respective pair of tubes 81 and 82 to create continuous side rails.

FIGS. 2, 4 and 5 illustrate the telescoping feature of the gripping and lift assembly 31. The gripper arms 44 and 45 are mirror images of each other, and thus only the arm 44 is illustrated in FIG. 4. The gripper arm 44 includes an interior sleeve 83 and an exterior sleeve 84 which extends around and is telescopically extendable and retractable relative to the interior sleeve 83. A telescoping piston & cylinder unit 85 is attached at one end 91 to the interior sleeve 83 via a transverse pin 92. An opposite end 93 of the piston & cylinder unit 85 is attached to the exterior sleeve 84 via a vertical pin 94. A bale gripping disc 95 is attached to the arm 44 via a shaft 96 extending through an opposed pair of bores 97. A retaining pin 98 extends through a terminal end of the shaft 96 to hold it in place. The disc 95 includes a number of gripper teeth 99 positioned peripherally around the disc 95 and extending inward therefrom. The gripper disc 95 is free to rotate via the shaft 96 as the gripper arm 44 is raised and lowered.

The operation of the gripping and lift assembly 31 is shown in FIG. 2. A round bale 21 is gripped between the two gripper arms 44 and 45 by retracting the gripping twin piston & cylinder unit 53. The gripper arms 44 and 45 are telescopically extended by extending the respective telescoping piston & cylinder units 85. This causes the larger exterior sleeve 84 to extend outward relative to the fixed, smaller interior sleeve 83 while leaving considerable overlap between the exterior sleeve 84 and the interior sleeve 83 when extended. This insures that the added strength provided by the larger sized exterior sleeve 84 is concentrated toward the remote end of the telescopically extended gripper arms 44 and 45. This prevents or minimizes the bending or racking of the gripper arms 44 and 45 experienced by prior art bale lifts, such as shown in FIG. 1, due to the leverage created by the weight of the large bale concentrated at the remote end of the arms 44 and 45.

FIGS. 5 and 6 illustrate the inventive gripping and lift assembly 31 adapted to lift and transport a large rectangular trash container 101. Again, the gripping and lift assembly 31 is shown attached to a truck 32 equipped with a flat bed 33 and is identical in all respects to the assembly shown in FIGS. 2–4 except for the replacement of the bale gripper discs 95 with container brackets 102. Referring to FIG. 5, in order to convert the assembly 31, the bale gripper discs 95 are removed from each arm 44 and 45 by removing the retaining pin 98 from the shaft 96 and siding the shaft 96 out of the gripper arms 44 and 45. The container bracket 102 is attached to the arms 44 and 45 via a shaft 103 extending through the opposed pair of bores 97. The retaining pin 98 is extended through a terminal end of the shaft 103 to hold it in place, just as in FIG. 4. The bracket 102 includes a flat side portion 104 designed to abut a respective vertical side 105 of the container 101 as the gripping twin piston & cylinder unit 53 is retracted. A flat top portion 106 extends at right angles with respect to the side portion 104 with the top portion 106 serving to support a respective one of a pair of gripping ledges 111 provided on either side of the trash container 101. Again, the gripper arms 44 and 45 are selectively, telescopically extendable and retractable in the same manner earlier described to allow great flexibility in handling the heavy trash containers 101.

Variations in construction detail will occur to those of ordinary skill in the art. For example, a pair of smaller lift piston & cylinder units could be substituted for the single lift piston & cylinder unit 41. The gripper arms 44 and 45 could be telescoped to provide the function of side rails instead of using extension tubes 81 and 82. Shapes and relative sizes of the components of the gripping and lift assembly 31 could be altered without affecting the overall viability of the invention.

It is thus to be understood that while certain forms of the present invention have been illustrated and described herein, it is not to be limited to the specific forms or arrangement of parts described and shown.

I claim:

1. A gripping and lift assembly for lifting large objects from ground level to an elevated bed, comprising:
   a. a lift housing attached to and being selectively pivotable relative to said flat surface;
   b. a gripping actuator positioned within said lift housing; and
   c. a pair of gripper arms with each said gripper arm being attached to said gripping actuator and being selectively movable inward and outward relative to said lift housing between grip and release positions, respectively, each said gripper arm including:
      i. an inner sleeve;
      ii. an outer sleeve which is larger than and extends around at least a portion of said inner sleeve;
      iii. a telescoping operating mechanism attached to both said inner and outer sleeves which allows said outer sleeve to be selectively, telescopically extended and retracted relative to said inner sleeve;
   d. a twin cylinder housing with first and second pistons operating within respective first and second cylinder housing portions, respectively, said first housing portion being of a smaller diameter than and being longer than said second housing portion such that the interior volume of said first and second housing portions are approximately equal; and
   e. a pressure equalizing tube interconnecting said first and second cylinder housing portions.

2. A gripping and lift assembly as in claim 1, wherein said pressure equalizing tube connects an inner, extend portion of said first housing portion with an outer, retract portion of said second cylinder housing portion.

3. A gripping and lift assembly as in claim 2 and further including first and second rephase ports positioned in the sidewall of the cylinder housing to bypass fluid around a movable seal when the respective pistons are fully extended.

4. A gripping and lift assembly for lifting large objects from ground level to an elevated bed, comprising:
   a. a lift housing attached to and being selectively pivotable relative to said flat surface;
   b. a pair of gripper arms; and
   c. a gripping actuator positioned within said lift housing with each said gripper arm being attached to said gripping actuator and being selectively movable inward and outward relative to said lift housing between grip and release positions, respectively, said gripping actuator comprising:
      i. a twin cylinder housing with first and second pistons operating within respective first and second cylinder housing portions, respectively, said first housing portion being of a smaller diameter than and being longer than said second housing portion such that the interior volume of said first and second housing portions are approximately equal; and
      ii. a pressure equalizing tube interconnecting said first and second cylinder housing portions.

5. A gripping and lift assembly as in claim 4 wherein each said gripper arm includes:
   a. an inner sleeve;
   b. an outer sleeve which is larger than and extends around at least a portion of said inner sleeve; and
   c. a telescoping operating mechanism attached to both said inner and outer sleeves which allows said outer sleeve to be selectively, telescopically extended and retracted relative to said inner sleeve.

6. A gripping and lift assembly as in claim 5, wherein each of said outer sleeves is a rectangular steel tube and each of said inner sleeves is also a rectangular steel tube, the exterior dimension of each side of each inner sleeve being smaller than the interior dimension of each equivalent side of each outer tube such that each of the outer tubes can slide over the respective inner tube.

7. A gripping and lift assembly as in claim 4, and further comprising:
   a. a respective inward facing support attached to each gripper arm proximate a terminal end thereof, each said support being freely rotatable relative to its respective gripper arm.

8. A gripping and lift assembly as in claim 7, wherein each said inward facing support is a hay bale gripping disc.

9. A gripping and lift assembly as in claim 7, wherein each said inward facing support is a trash container support bracket.

10. A gripping and lift assembly as in claim 7, wherein said inward facing supports are hay bale gripping discs; or trash container support brackets which are interchangeable with each other.

11. A gripping and lift assembly as in claim 4, wherein said pressure equalizing tube connects an inner, extend portion of said first housing portion with an outer, retract portion of said second cylinder housing portion.

12. A gripping and lift assembly as in claim 11 and further including first and second rephase ports positioned in the sidewall of the cylinder housing to bypass fluid around a movable seal when the respective pistons are fully extended.

* * * * *